J. HIBBS.
Clover Huller.
No. 7,474.
Patented July 2, 1850.
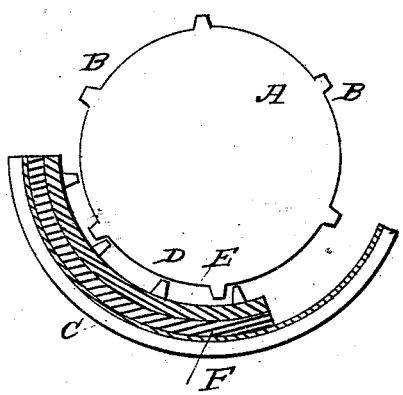
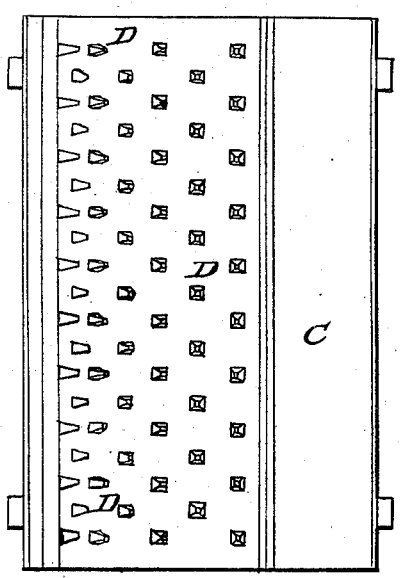
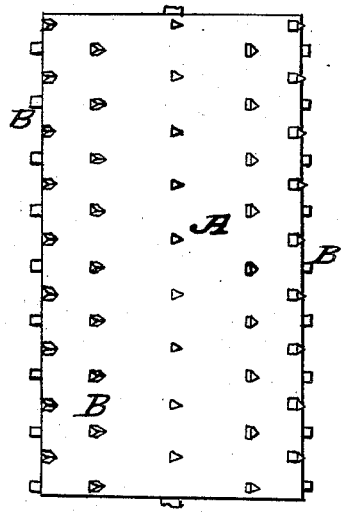

UNITED STATES PATENT OFFICE.

JONATHAN HIBBS, OF BRISTOL, PENNSYLVANIA.

SETTING THE TEETH ON THE CONCAVE OF A CLOVER-THRESHER.

Specification of Letters Patent No. 7,474, dated July 2, 1850.

*To all whom it may concern:*

Be it known that I, JONATHAN HIBBS, of Bristol, in the county of Bucks and State of Pennsylvania, have invented certain Improvements in Machines for Threshing and Hulling Clover-Seed, &c., and that the following is a full, clear, and exact description of the principle or character which distinguishes this from all other things before known and of the usual manner or making, modifying, and using the same, reference being had to the accompanying drawings, of which—

Figure 1 is a transverse section through the cylinder and concave; Fig. 2 a general view of the cylinder, and Fig. 3, a view of the concave.

The object of this improvement is to obviate the most important difficulties hitherto experienced in machines for threshing and hulling clover seed. It has been found that the teeth when firmly fixed in both the cylinder and the concave, were extremely liable to be either bent or fractured, by the accidental passage of small stones or other foreign substances through the machine, (it being difficult to harvest such a crop as clover without more or less dirt being collected with it); and when a tooth was so bent over it would allow the seed to pass on one side without being hulled, and on the other side the seed would be cut to pieces by the close proximity of the teeth to each other. And a tooth when once bent down, if constructed in the ordinary manner would remain so permanently, thereby allowing much of the seed to pass through the machine unacted upon. The said improvement consists in so setting the teeth of the concave that there shall be a slight degree of elasticity given to them, so that they move out of the way of any stones &c. which may accidentally get into the machine along with the clover, and after the obstruction shall have passed the tooth returns to its original position, without having suffered injury by its passage.

These objects are accomplished substantially in the manner herein set forth, as follows, A Fig. 1. represents a transverse section of the revolving cylinder, showing the teeth B, set on its surface. These teeth are made in the form of an acute triangular prism, and revolve with their acute edges in advance. C is a section of the concave or bed piece of the machine, on this the teeth. D, are inserted in a stout piece of leather or other elastic material E, and a layer of cork F, is placed between the concave and the leather in which the teeth are inserted. The teeth D I prefer to make round and tapering to a blunt point. The motion is given to the machine and it is worked in a similar manner to those hitherto used.

What I claim and desire to secure by Letters Patent, is—

The right to use and manufacture machines for the purpose of threshing and hulling clover and other seeds of a similar nature, having the teeth of the concave, or the stationary set of teeth so inserted in leather on a bed of cork, as to give them an elasticity sufficient to cause them to resume their original position when misplaced by the passage of any foreign substances which may be introduced by accident or otherwise into the machine.

JONATHAN HIBBS.

Witnesses:
   JOSEPH BURTON,
   GEORGE MITCHELL.